United States Patent [19]

Kobayashi et al.

[11] Patent Number: 5,032,489
[45] Date of Patent: Jul. 16, 1991

[54] OPTICALLY FUNCTIONAL ELEMENT

[75] Inventors: Eiichi Kobayashi, 208-28, Ooaota, Kashiwa-shi, Chiba; Toyoshi Ohashi, Chiba; Mitsutaka Miyabayashi, Mie, all of Japan

[73] Assignees: Eiichi Kobayashi, Kashiwa; Mitsubishi Petrochemical Co., Ltd., Yokkaichi, both of Japan

[21] Appl. No.: 485,812

[22] Filed: Feb. 26, 1990

Related U.S. Application Data

[63] Continuation of Ser. No. 129,398, Nov. 24, 1987, abandoned, and a continuation of Ser. No. 835,096, Feb. 28, 1986, abandoned.

[30] Foreign Application Priority Data

Mar. 4, 1985 [JP] Japan .................................. 60-41315
May 7, 1985 [JP] Japan .................................. 60-95589

[51] Int. Cl.⁵ ............................................. G03C 1/705
[52] U.S. Cl. .................................... 430/271; 430/945;
430/18; 430/21; 430/286; 346/76 R; 346/135.1;
346/76 L; 528/375; 528/376
[58] Field of Search ................... 430/945, 18, 21, 286,
430/271; 346/76 R, 135.1, 76 L

[56] References Cited

U.S. PATENT DOCUMENTS 3,940,374 2/1976 Oswald et al. ...................... 522/1 X

FOREIGN PATENT DOCUMENTS 0228540 10/1985 Japan .................................. 528/376

OTHER PUBLICATIONS

Chemical Abstracts: 167244u for Eiichi Kobayashi, Kenkyu Hokoku-Asahi Garasu Kogyo Gijutsu Shoreikai, 1984, vol. 45, pp. 153-162, from vol. 102, May 20, 1985.
Kobayashi, Polymer Preprints, Japan, vol. 33, No. 9, "Copolyaddition of Benzendedithiol with Diethynylbenzene and their Electrical Properties", 1984, pp. 2507-2512.
Kobayashi, Syntheses of New Polymers by Copolymerization, "Polyaddition Reaction of Diethynylbenzene (DEB) and Benzenedithiol (BDT)", 1984, vol. 45, pp. 153-162.

Primary Examiner—Cynthia Hamilton
Attorney, Agent, or Firm—Oblon, Spivak, McClelland, Maier & Neustadt

[57] ABSTRACT

An optically functional element comprising an aromatic vinylene sulfide polymer as an optically changing element is disclosed. The optically functional element undergoes optical changes with low energy at a high rate to provide high contrast before and after the optical changes.

17 Claims, 3 Drawing Sheets

OPTICALLY FUNCTIONAL ELEMENT

This application is a continuation of application Ser. No. 129,398 filed on Nov. 24, 1987, now abandoned and Ser. No. 835,096 filed on Feb. 28, 1989, now abandoned.

FIELD OF THE INVENTION

This invention relates to an optically functional element, such as an optical recording medium with which information can be recorded by external energy, e.g., light energy, heat energy, etc., and an optical switch.

BACKGROUND OF THE INVENTION

Optical recording media are characterized in that they do not contact a recording or reading head so that they do not undergo wear or deterioration; that high density recording is possible with a light beam of condensed laser rays, etc.; that recording and reading can be carried out at a high speed; and that the access time is short.

Further, recording on such optical recording media can be effected by converting information to be recorded to electric time series signals and scanning the media with a laser beam modulated in accordance with the signals. This recording system is advantageous in that recorded images can be obtained in a real time.

The above-described optical recording media include photomagnetic recording media using MnBi type polycrystalline materials or rare earth element-transition metal type amorphous alloys, e.g., Gd-Co, Gd-Tb-Fe, etc. In this recording system, recording is carried out by both heating with laser rays and external application of a magnetic field, and reproduction is carried out by making use of a difference in rotational direction of a vibration plane of light, arising from a difference in magnetic direction. In particular, vertical photomagnetic recording media in which magnetic lines are perpendicular to the recording media can be used for high density recording. However, these photomagnetic recording media have a disadvantage of poor sensitivity in reproduction and very low S/N ratios, which cause errors in reading out, giving rise to a serious bar to practical application.

The optical recording media further include media comprising a thin film of a metal, e.g., Te, Bi, As-Te-Se, etc., in which a condensed laser beam is irradiated on the metal thin film to locally vaporize the metal to form pits, and reproduction is effected by reading the presence of the pits.

These recording media, however, involve problems such that laser rays of high power are required; that control on pit shape is so difficult as to result in high noise level; and the like.

Additional optical recording media include those utilizing transformation of Te-TeO thin film from an amorphous state to a crystalline state, and those utilizing a blackening phenomenon attributable to structural changes of an Se-S type thin film between metastable states within an amorphous phase thereof.

However, the Te type media has problems of toxicity and of insufficient contrast between recorded areas and unrecorded areas. Further, the Se-S type thin film shows low recording sensitivity, and its absorption edge is in a relatively short wavelength region. In the vicinity of such an absorption edge, light absorption is weak, and recording sensitivity at longer wavelengths is particularly poor.

Under these circumstances, it has keenly been demanded to develop recording media having improved recording sensitivity, improved S/N ratios by high density recording and increased optical contrast between recorded areas and unrecorded areas, and freedom from toxicity.

SUMMARY OF THE INVENTION

An object of this invention is to provide a non-toxic optically functional element which undergoes optical changes with low energy at a high rate to provide high contrast between before and after the optical change.

Another object of this invention is to provide an optical recording medium which can repeatedly be used for re-recording, or an optical switch.

These objects can be accomplished by an optically functional element comprising an aromatic vinylene sulfide polymer as an optically changing element.

BRIEF DESCRIPTION OF ACCOMPANYING DRAWINGS

FIGS. 1, 2 and 3 each shows a cross-sectional view of the optical recording media according to the present invention;

FIG. 4 is an X-ray diffraction pattern of the recording media when effecting the phase transition to Phase C in Example 1; and FIG. 5 is an X-ray diffraction pattern of the recording media when effecting the phase transition to Phase A in Example 1.

DETAILED DESCRIPTION OF THE INVENTION

Figure 1:
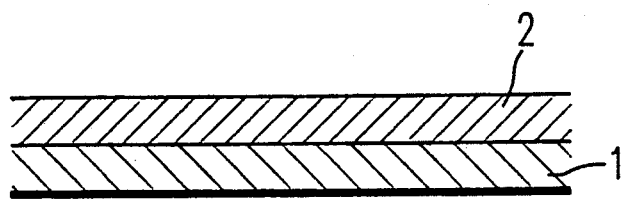

The aromatic vinylene sulfide polymer which can be used as an optically changing element for the optically functional element of the present invention is characterized by its repeating unit structure and molecular weight. Further, the aromatic vinylene sulfide polymer of this invention is preferably characterized by its crystallinity.

The aromatic vinylene sulfide polymer of the present invention comprises a repeating unit represented by the formula (I):

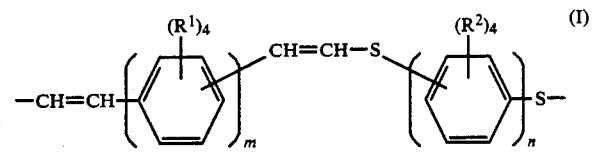

wherein $R^1$ and $R^2$, which may be the same or different, each represents a hydrogen atom, an alkyl group having from 1 to 12 carbon atoms, a halogen atom, an amino group, an amido group, a nitro group, a cyano group, a trifluoro group, an alkoxy group, a carboxyl group, a hydroxyl group, an alkylamino group, an alkylhydroxyl group, an alkylcarboxyl group or an aldehyde group; and m and n each represents an integer of from 1 to 5.

When m and/or n in the formula (I) is an integer of from 2 to 5, the substituents in the repeating units and the structures of the repeating units may be the same or different.

The aromatic vinylene sulfide polymer which can be used in the present invention include those wherein m and n each is an integer of from 1 to 5. Of these polymers, those wherein m and n each is an integer of from 1 to 3 are preferred, with those wherein m and n are both 1 or 2 being more preferred.

In the above-described formula (I), the polyphenyl group comprises two or more benzene rings connected to each other at optional positions, and preferably at para-positions. For example, a terphenyl group of the formula

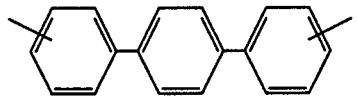

is particularly preferred.

The vinylene group —CH=CH— may be bonded to a benzene ring or polyphenyl group at any optional position. In particular, when a vinylene group is bonded to a benzene ring, it is preferably bonded thereto at the meta- or para-position, and more preferably para-position. When a vinylene group is bonded to a polyphenyl group, preferred bonding to a biphenyl group is as in the formulae:

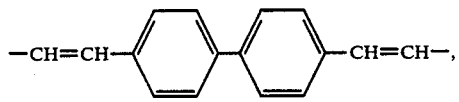

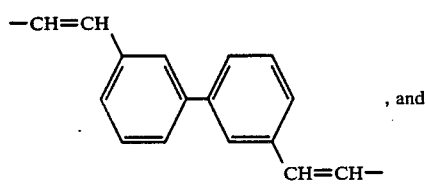

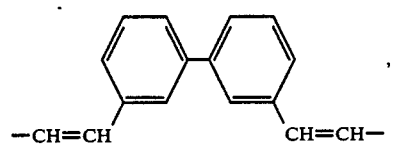

with the bonding as in the first formula being more preferred; and preferred bonding to a terphenyl group is as in the formulae:

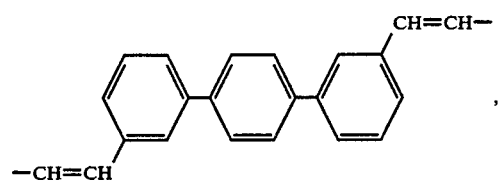

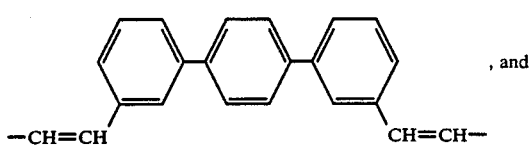

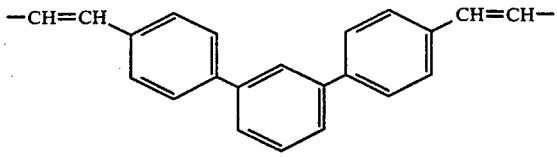

with the bonding as in the first formula being more preferred.

The sulfido group —S— may be bonded to a benzene ring or polyphenyl group at any optional position, but is preferably bonded thereto at the position thereof which is preferred in the vinylene group.

$R^1$ and $R^2$ each preferably represents a hydrogen atom, an alkyl group having 1 to 3 carbon atoms, a halogen atom, an amino group, a nitro group, a cyano group, a trifluoro group, a hydroxyl group or a carboxyl group, and more preferably a hydrogen atom, an alkyl group having from 1 to 3 carbon atoms, a halogen atom, an amino group, a nitro group, a cyano group or a trifluoro group.

The substituents $R^1$ and $R^2$ can be selected so as to be in agreement with the desired function to be derived from the aromatic vinylene sulfide polymer. From the standpoints of ease in synthesis of starting monomers, etc., the substituents $R^1$ and $R^2$ each preferably includes a hydrogen atom, a halogen atom, a methyl group and an ethyl group, and more preferably a hydrogen atom.

Further, in view of reactivity, and the like, it is preferable to select at least one of $(R^1)_4$ from electron-attractive groups and/or (preferably "and") at least one of $(R^2)_4$ from electron-donative groups.

The aromatic vinylene sulfide polymer of the present invention has a number average molecular weight of from 800 to 500,000, preferably from 840 to 100,000, more preferably from 950 to 15,000, and most preferably from 1,150 to 9,500, as determined by end-group analysis using a metal acetylide or vapor pressure osmometry (VPO).

The aromatic vinylene sulfide polymer of the present invention may further contain a small proportion, e.g., up to 20% by weight, of other bondage units, such as

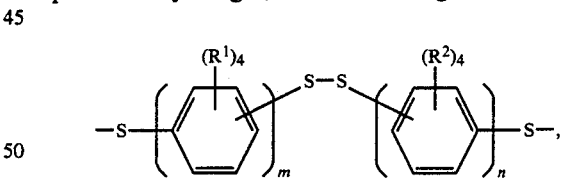

wherein $R^1$, $R^2$, m and n are as defined above.

End groups of the aromatic vinylene sulfide polymer of the present invention include an ethynyl group and a mercapto group.

In the present invention, the aromatic vinylene sulfide polymer is preferably crystalline. The crystallinity can be confirmed by, for example, crystal peaks of X-ray diffraction patterns. The crystalline aromatic vinylene sulfide polymer may have any form, such as a polycrystalline form composed of fine single crystal grains, a single crystal form, and the like.

The crystalline aromatic vinylene sulfide polymer can have an optional crystallinity but preferably has a crystallinity of from 10 to 100%, more preferably from 50 to 100%, and most preferably from 80 to 100%, as determined by X-ray analysis Although the structure of the crystalline moiety of the crystalline polymer has not yet been clarified, it is considered that the crystalline structure is formed by regular conformation and packing of the repeating unit represented by the above-described formula (I).

In view of ensuring high crystallinity, the crystalline aromatic vinylene sulfide polymer preferably has a number average molecular weight of from 800 to 15,000, more preferably from 840 to 9,500, and most preferably from 950 to 8,500.

The above-described aromatic vinylene sulfide polymer having a repeating unit of the formula (I) can be obtained by addition polymerization of a monomer represented by the following formula (II) and a monomer represented by the following formula (III):

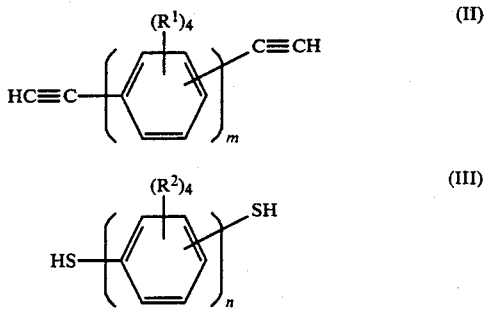

wherein $R^1$, $R^2$, m and n are as defined above.

Specific preferred examples of combinations of the monomers (II) and (III) are 1,1'-diethynylbiphenyl and 1,1'-dithiolbiphenyl; 1,1'-diethynylterphenyl and 1,1'-dithiolterphenyl; 2-trifluoromethyl-1,4-diethynylbenzene and benzenedithiol; 2-nitro-1,4-diethynylbenzene and 2-methyl-1,4-benzenedithiol; p-diethynylbenzene and 2-amino-1,4-benzenedithiol; 2,3,5,6-tetrafluoro-1,4-diethynylbenzene and p-benzenedithiol; 2,3,5,6-tetrafluoro-1,4-diethynylbenzene and 3,5-dimethyl-1,4-benzenedithiol; p-diethynylbenzene and 2,3,5,6-tetramethyl-1,4-benzenedithiol; p-diethynylbenzene and p-benzenedithiol; 2,6-difluoro-1,4-diethynylbenzene and 3,5-dimethyl-1,4-benzenedithiol; p-diethynylbenzene and 3,5-dimethyl-1,4-benzenedithiol; and the like. The above-enumerated combinations are not limitative, and any other combinations of monomers (II) and (III) may be used.

The polymerization reaction can be carried out in a homogeneous solution in a solvent capable of dissolving both the compounds (II) and (III). Specific examples of the solvent that can be used include aromatic hydrocarbons, e.g., benzene, toluene, etc.; ethers, e.g., tetrahydrofuran, dioxane, etc.; halogenated hydrocarbons, e.g., chloroform, methylene chloride, etc.; and so on.

The monomer mixture to be polymerized is prepared by a process wherein the compounds (II) and (III) are simultaneously sublimated and deposited on a support base, a process in which a homogeneous solution containing the compounds (II) and (III) is coated on a support base and the solvent is then removed by evaporation, and a like process. These processes are preferred for the production of an aromatic vinylene sulfide polymer film on a base.

Addition polymerization can be performed by irradiating the above-described monomer mixture with actinic rays. The actinic rays to be employed include electromagnetic waves, e.g., visible rays, ultraviolet rays, γ rays, X rays, etc., electron rays, neutron rays, and the like. The addition polymerization may be effected in the presence of a radical generator, such as benzoyl peroxide, etc., or in the presence of a trace amount of oxygen. The addition polymerization temperature ranges from −70° to 200° C., and preferably from −40° C. to 100° C.

The end groups of the addition polymer can be varied depending on the proportions of the compound (II) and the compound (III). For example, an addition polymer terminated with ethynyl groups can be obtained by using the compound (II) in a larger proportion than the compound (III), and addition of a metal compound, e.g., cuprous chloride, to the ethynyl-terminated polymer gives a polymer having metal acetylide end groups.

The crystalline aromatic vinylene sulfide polymer of the present invention can advantageously be prepared by simultaneously evaporating the compounds of the formulae (II) and (III) to deposite mixed monomer crystals on a base and irradiating the mixed monomer crystals with actinic rays to cause solid phase polymerization. It was elucidated by the present inventors that simultaneous evaporation of the compounds (II) and (III) results in regular alignment of these compounds on a base to form a crystalline structure which easily undergoes addition polymerization. It is considered that irradiation of the mixed deposite of the monomer crystals of the compounds (II) and (III) with actinic rays is effective to substantially maintain the crystalline structure of the monomers and to make addition polymerization proceed while keeping the monomers in a regularly aligned state to thereby produce a crystalline polymer.

The base on which the compounds (II) and (III) are simultaneously deposited to form a thin film includes a glass plate, a plastic film or sheet, a metal plate, a ceramic plate, etc. In order to obtain high quality crystals, it is preferable to use a base made of alkali halide single crystals so that crystals of the mixed monomer may epitaxially grow thereon.

Simultaneous evaporation of the compounds (II) and (III) can usually be carried out by vacuum deposition. Growth of crystals of the deposited mixed monomer can be controlled by the degree of vacuum, sublimation temperature, base temperature, and the like.

It is necessary to set the base temperature below the melting point of the deposited mixed monomer crystals, preferably at least 5° C. lower, more preferably at least 10° C. lower, and most preferably at least 15° C. lower, than the melting point. If the deposition is performed with the base temperature in the vicinity of or higher than the melting point of the deposited mixed monomer crystals, the deposit cannot have a good crystal structure and, therefore, irradiation of the deposit with actinic rays fails to obtain a highly crystalline polymer. Close control on growth of deposited mixed monomer crystals can further be ensured by adopting a molecular beam deposition process, in which evaporated molecules are deposited in the form of molecular beams.

The deposited mixed monomer crystals are then irradiated with actinic rays to cause addition polymerization. During the irradiation, the reaction temperature should be kept lower than the melting point and sublimation temperature of the deposited mixed monomer crystals, preferably at least 5° C. lower, more preferably at least 10° C. lower, and most preferably at least 15° C. lower, than the melting point or sublimation temperature of the mixed monomer crystals. If the addition polymerization is conducted at temperatures in the vicinity of or higher than the melting point of the mixed monomer crystals, the resulting polymer is of extremely low crystallinity or even amorphous.

The aromatic vinylene sulfide polymer in accordance with the present invention can be applied to optically functioning elements, such as optical recording media and optical switches.

The optical recording media of the present invention can be produced by forming a thin film of the aromatic vinylene sulfide polymer of this invention on a base. The base to be employed includes transparent plastic plates, e.g., polymethyl methacrylate, polycarbonate, etc., and transparent inorganic materials, e.g., glass, etc. Opaque bases, such as aluminum alloy plates, may also be used in cases when recording and reading are effected by irradiating light only from the side opposite to the base.

Film thickness of the aromatic vinylene sulfide polymer which constitutes the optical recording layer is not particularly limited and is usually from 10 Å to 100 μm.

Figure 2:
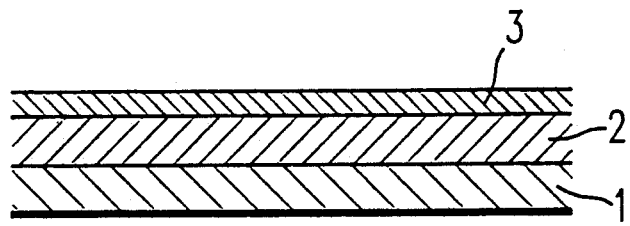
Figure 3:
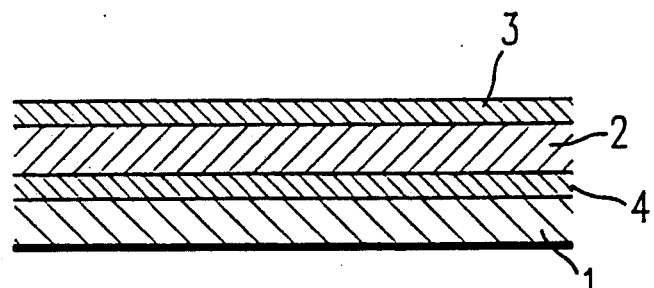

The optical recording media according to the present invention are characterized by the optical recording layer comprising the aromatic vinylene sulfide polymer, preferably being crystalline, of the present invention and, hence, the layer structure thereof is not particularly restricted. However, examples of the layer structure usually employed in optical recording media are shown in FIGS. 1, 2 and 3. In FIGS. 1, 2 and 3, the numerals 1 and 2 indicate a base and an optical recording layer comprising the aromatic vinylene sulfide polymer, respectively. In FIGS. 2 and 3, the numeral 3 indicates a protective layer comprising a transparent inorganic substance or a resin, e.g., acrylic resins. In FIG. 3, the numeral 4 indicates a reflective layer comprising Al, Ag, etc.

It has now been found that the aromatic vinylene sulfide polymer according to the present invention possesses two or more stable or metastable states. In the following description, one of the two of these stable or metastable states is designated as Phase A, and the another is designated as Phase C. Phases A and C can be distinguished by, for example, absorption spectra or reflection spectra. They are also distinguishable by, for example, X-ray diffractometry, i.e., by a difference in height of a sharp crystal peak. The state showing a higher crystal peak, i.e., a more regular molecular array, is designated as Phase C, and the state showing a lower crystal peak, i.e., a less regular molecular array, is designated as Phase A. When X-ray diffraction pattern of Phase A shows substantially no crystal peak, such a phase is called an amorphous phase, while Phase C having a sharp crystal peak is called a crystal phase, the states of Phase A and Phase C can be regarded as an amorphous phase and a crystalline phase, respectively. Thus, two or more stable or metastable states of the aromatic vinylene sulfide polymer are distinguishable by a difference in optical characteristics, and one of them can be set as a unrecorded state with at least one of the rest being taken as a recorded state.

It has further been found that application of external energy, such as light energy and heat energy, induces phase transition between Phase A and Phase C.

More specifically, phase transition from Phase C to Phase A, i.e., from the state having a more regular molecular array to the state having a less regular molecular array can effectively be induced by external application of optical energy or heat energy. Optical energy is preferred since it can be locally concentrated to realize high density recording. In cases of using optical energy, phase transition can be achieved by either utilizing a photon effect or heat mode of light.

Use of a photon effect requires proper selection of a wavelength of light to be used, while use of a heat mode does not involve such limitation. However, use of a photon effect is preferred because phase transition can rapidly be effected.

Phase transition from Phase A to Phase C, i.e., from the state having a less regular molecular array to the state having a more regular molecular array, in turn, can effectively be induced by the use of light having a specific wavelength. Namely, phase transition from Phase A to Phase C can be achieved by utilizing a photon effect.

Thus, phase transition between Phases A and C of the aromatic vinylene sulfide polymer can reversibly be induced.

If Phase A is taken as an unrecorded state and Phase C is set as a recorded state, phase transition from Phase A to Phase C corresponds to recording, and the reverse corresponds to erasing of recorded information, or vise versa.

Light sources of optical energy which can be used for recording or erasing include lasers having wavelengths in ultraviolet, visible through infrared regions, such as semi-conductor lasers, gas lasers, dye lasers, etc., and various pulse generating lamps, such as xenon flash lamps, etc.

The term "light of a specific wavelength" strictly means a monochromatic ray having a specific wavelength, but practically covers laser light showing an oscillation spectrum with a certain spectral line breadth which contains a monochromatic ray having a specific wavelength, or dispersed light containing a monochromatic ray having a specific wavelength which is isolated by various spectrographs. In general, since the wavelength inducing phase transition of the aromatic vinylene sulfide polymer from Phase A to Phase C is different from that inducing phase transition from Phase C to Phase A, the light with which to record or erase may have an optional wavelength distribution as long as it contains light inducing desired phase transition but does not contain light inducing the reverse phase transition. Nevertheless, in order to ensure high recording density and efficient induction of phase transition, it is desirable to use laser light excellent in directionality for intended phase transition, i.e., excellent in monochromatic property.

When recording of information is carried out on the optical recording media of the present invention, usual first-order recording is possible, in which Phases A and C, for example, of the aromatic vinylene sulfide polymer correspond to 0 and 1, respectively, in one bit.

Further, it is possible to apply the optical recording system of the present invention to multi-order recording by assigning n molecular arrays to n stable or metastable states of the aromatic vinylene sulfide polymer.

In addition, a further larger amount of information can be recorded by using a multi-layer recording medium, in which two or more aromatic vinylene sulfide polymers being different in substituents ($R^1$ or $R^2$) or being different in molecular weight are laminated and phase transition between Phase A and Phase C in each layer is selectively induced upon irradiation of light having a specific wavelength.

As described above, the optical recording media in accordance with the present invention makes it possible to record information at high densities that have never been attained by the conventional recording media.

The thus recorded information can be read by making use of a difference of two or more stable or metastable states of the aromatic vinylene sulfide polymer in terms of optical characteristics. Usually, reading can be carried out making use of a difference in reflectance or absorptivity coefficient between Phases A and C. In the former case, light is irradiated on the optical recording layer on which information has been recorded, and the intensity of the light reflected from the recording layer surface is read out. In the latter case, the intensity of the light having passed through the recording layer is read out. The greater the difference in reflectance or absorptivity coefficient between recorded areas and unrecorded areas, the greater the S/N ratio at the time of reproduction.

In the present invention, the aromatic vinylene sulfide polymer to be employed can be so selected as to obtain high S/N ratios in reproduction.

Light which can be used for reading of recorded information has wavelengths within a spectral range of from the shorter wavelength end to the longer wavelength end of the light absorption (or reflection) spectra of Phases A and C. Polarized light may be used for reading as well.

The aromatic vinylene sulfide polymer in accordance with the present invention can also be applied to other optically functional element, such as optical switches, taking advantage of their optical changes, for example, change in refractive index.

The present invention will now be illustrated in greater detail with reference to the following examples, but it should be understood that these examples are not deemed to limit the present invention.

EXAMPLE 1

Synthesis of p-Benzenedithiol

1) Synthesis of Sodium Ethanethiolate

Sodium (0.2 mol) and 60 ml of ethanol were reacted at room temperature for 60 minutes under a nitrogen atmosphere, and 0.2 ml of ethanethiol was then added to the reaction mixture dropwise over a period of 30 minutes. The reaction mixture was stirred at room temperature for about 1.5 hours. The reaction mixture was concentrated to half the volume by distillation of ethanol. The concentrate was poured into 500 to 700 ml of diethyl ether. The precipitate was collected by filtration, washed with diethyl ether and dried over calcium chloride at room temperature under reduced pressure to obtain sodium ethanethiolate in a yield of 90 to 95%.

2) Synthesis of p-Bis(Ethylthio)Benzene

In 200 ml of hexamethylphosphoric triamide were dissolved 0.05 ml of p-dichlorobenzene and 0.2 mol of sodium ethanethiolate, and the solution was allowed to react at 100° C. for 30 minutes while stirring. The reaction mixture was poured into 2 liters of a saturated sodium chloride aqueous solution, and the aqueous layer was extracted with diethyl ether. The ether layer was washed with water, dried over potassium hydroxide overnight, and distilled to remove the diethyl ether to obtain p-bis(ethylthio)benzene in a yield of 90 to 95%.

3) Synthesis of p-Benzenedithiol p-Bis(ethylthio)benzene (0.03 mcl) was dispersed in 30 to 50 ml of liquid ammonia, and 0.12 mol of sodium was added thereto under stirring. Thirty minutes later, ammonium chloride was added to the reaction mixture, followed by stirring well to decompose the excess of sodium. Thereafter, the liquid ammonia was removed by distillation. The residual solid was placed in 200 ml of a 6N aqueous solution of hydrochloric acid, and the thus precipitated white crystals were collected by filtration, thoroughly washed with water and dried in a desiccator containing calcium chloride under reduced pressure at room temperature for one day. The resulting crude crystals were purified by sublimation at 70° C. under reduced pressure of 0.5 mmHg, followed by recrystallization from ethyl acetate, followed by resublimation to obtain p-benzenedithiol

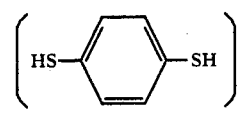

having a melting point of 97.5 to 98.5° C. in a yield of 90%.

The nuclear magnetic resonance spectrum of the product (60 MHz, CDCl$_3$, standard: tetramethylsilane) showed two singlets at $\delta$ values of 3.2 and 7.2 ppm at an integral ratio of 1:2. The infrared absorption spectrum of the product showed typical absorption at 2550, 470, 1390, 1250 and 800 cm$^{-1}$.

Synthesis of p-Diethynylbenzene

1) Synthesis of 1,4-Bis(1,2-Dibromoethyl)Benzene

In a 2 liter-volume four-necked flask equipped with a stirrer, a thermometer, an Allihn condenser and an exhaust tube for hydrogen bromide (connected to an aspirator via a safety bottom and an alkali aqueous solution), 170.1 g of p-divinylbenzene and 1 liter of chloroform, and the mixture was cooled to 5° C. or lower in an ice bath. To the cooled mixture was added dropwise 423 g of bromine through a dropping funnel having a by-pass over about 3 hours while stirring. After the dropwise addition, stirring was continued for an additional 2 hours at room temperature. The reaction mixture was transferred to a 2 liter-volume beaker and left to stand to allow the crystals to grow, followed by filtration by suction to collect crude crystals. On the other hand, the filtrate was repeatedly concentrated and cooled for crystallization to obtain crude crystals. The combined crude crystals were purified by recrystallization from chloroform to obtain crystals having a melting point of 155° to 157° C. in a yield of 81%.

2) Synthesis of p-Diethynylbenzene

In a 2 liter-volume four-necked flask having the same equipments as used in 1) above were charged 100 g of 1,4-bis(1,2-dibromoethyl)benzene, 103 g of potassium t-butoxide and 1 liter of t-butyl alcohol, and the mixture was stirred taking care not to rapidly raise the temperature by cooling on an ice bath. The stirring was continued while gradually elevating the temperature finally to a refluxing temperature, at which stirring was conducted for 1.5 hours. The reaction mixture was poured into 6 liters of ice-water, and the thus formed precipitate was filtered by suction. Purification by sublimation (60°±3° C., 1 to 2 mmHg) gave 22.4 g of crystals of p-diethynylbenzene

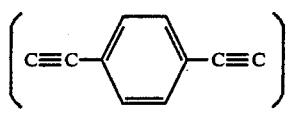

having a melting point of 96.5° C.

The nuclear magnetic resonance spectrum of the product showed two singlets at δ values of 3.1 and 7.3 ppm at an integral ratio of 1:2, and the infrared absorption spectrum of the product showed strong absorption at 3270, 2100, 1920, 1500, 1400, 1260 and 840 cm$^{-1}$.

Production of Optical Recording Medium

In a boat of an apparatus for vacuum evaporation coating was placed an equimolar mixture comprising powderous crystals of p-diethynylbenzene and p-benzenedithiol, and the vacuum chamber was evacuated to a degree of vacuum of 0.5 Torr. Then, the evaporation source was sublimated for 30 seconds by heating at 60° C. to thereby form a thin film of a mixture of p-diethynylbenzene and p-benzenedithiol on a quartz glass base. The deposited film was irradiated with ultraviolet rays for 12 minutes with a 300 W high pressure mercury lamp while maintaining the film temperature at 60° C. to form an addition polymer layer having a thickness of 10.6 μm.

Figure 4:
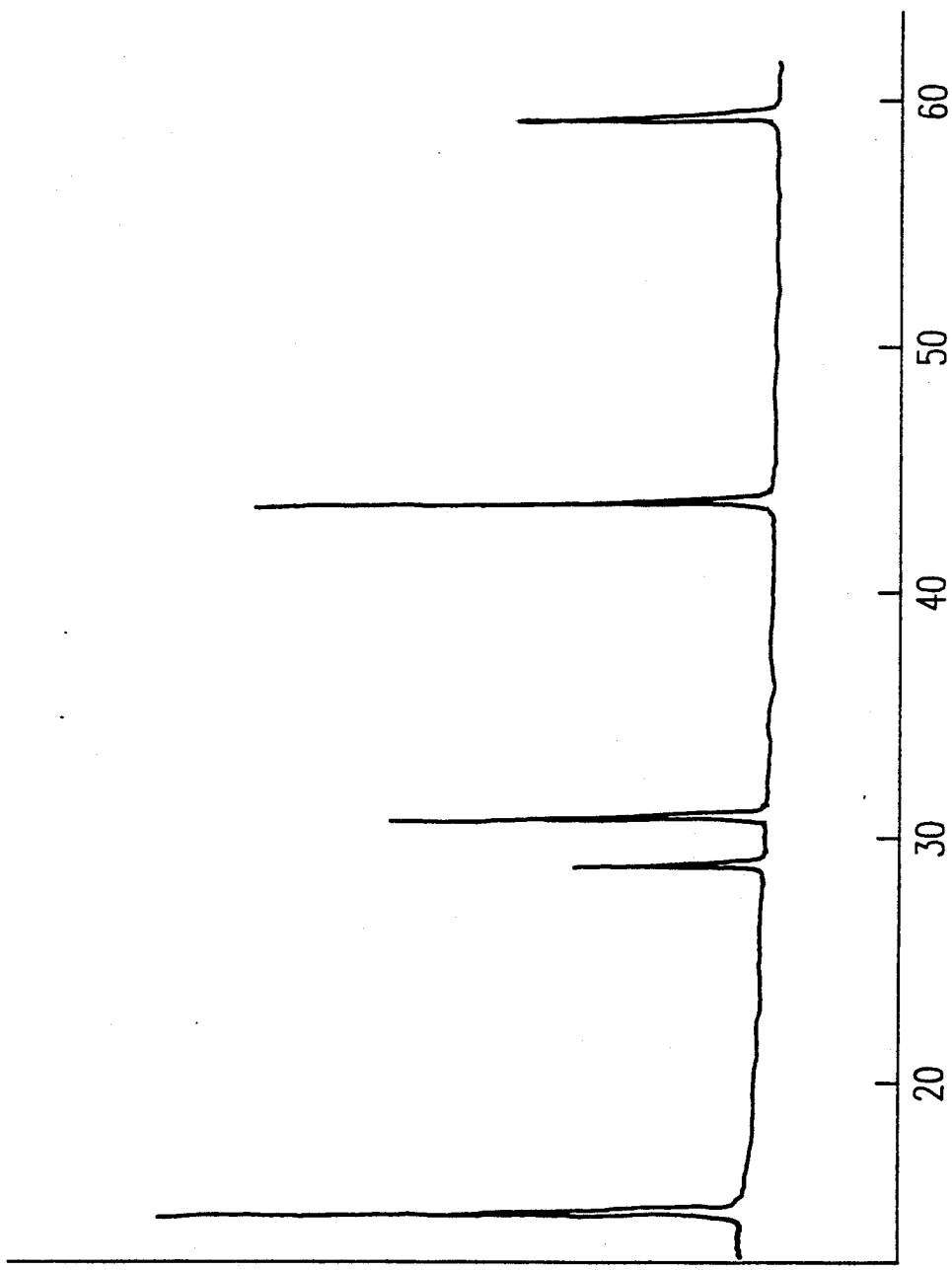

The thus prepared addition polymer showed a sharp crystal peak at 2 θ=14° (d=7.73Å) in its X-ray diffraction pattern as shown in FIG. 4. The number average molecular weight was 3,000 as determined by a copper acetylide method. Elementary analysis, infrared absorption analysis and X-ray diffractometry revealed that this polymer was a crystalline addition polymer of diethynylbenzene and benzenedithiol comprising a repeating unit of the formula:

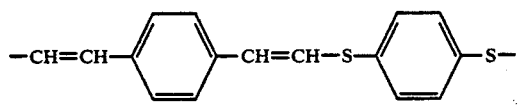

and having a crystallinity of almost 100%.

Figure 5:
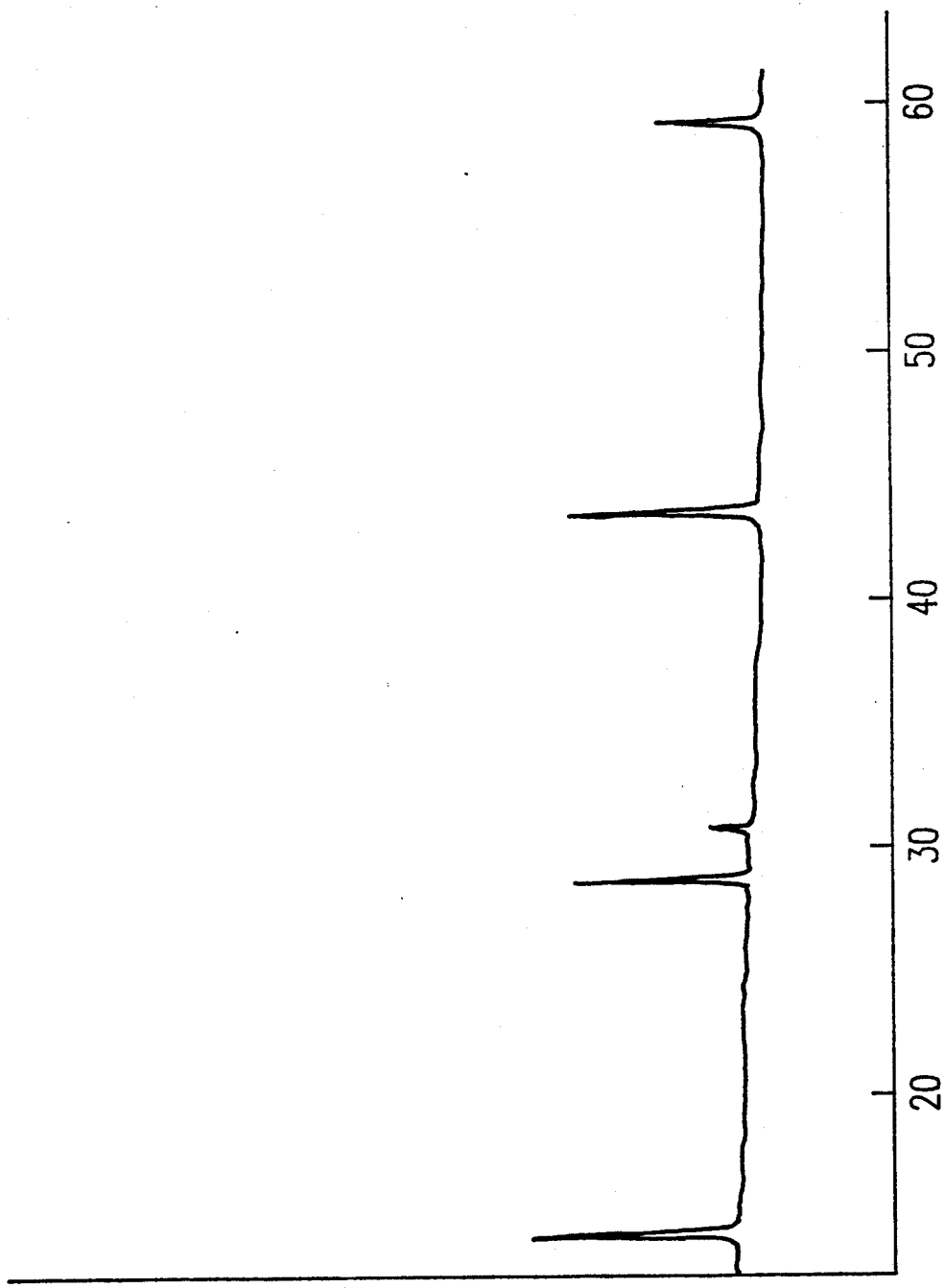

The thus produced optical recording medium comprising a quartz glass base having provided thereon an optical recording layer composed of the aromatic vinylene sulfide polymer was irradiated with 0.0027 J/cm$^2$ of light having a wavelength of 567.8 nm isolated by a grating spectrograph. This light irradiation brought about an increase of the peak intensity at 2 θ=14° (d=7.73Å) in the X-ray diffraction pattern (shown in FIG. 5) of the polymer crystal. The state having a crystallinity corresponding to the increased peak intensity was designated as Phase C, which was set as an unrecorded state of the recording layer.

The recording layer was then irradiated with light having a wavelength of 36.70 nm, which was isolated by grating spectrograph, at an energy density of 0.00438 J/cm$^2$, whereby the intensity of the crystal diffraction peak at 2 θ=14° (d=7.73Å) was decreased to 40% based on the increased peak intensity of the unrecorded state. This state was designated as Phase A, which was set as a recorded state of the recording layer.

The difference between Phase A and Phase C in reflection spectrum was about 10%. The recorded information could be read by making use of this difference.

The optical recording layer after recording was irradiated with light of 567.8 nm diffracted by a grating spectrograph to thereby increase the peak intensity of the X-ray diffraction pattern at 2 θ=14° (d=7.73Å) to the initial level before recording. Thus, Phase A of the recorded area was returned to Phase C, that is, the recorded information was erased.

Recording, reading and erasing could be repeated in the same manner as described above.

EXAMPLE 2

Recording, reading and erasing were repeatedly carried out on the same optical recording medium in the same manner as described in Example 1 except that the phase transition from Phase C to Phase A was induced by heating in place of irradiation of light having a specific wavelength. That is, recording was effected by a heat mode, and erasing was effected by a photon mode.

EXAMPLE 3

Recording and reading were carried out on the same optical recording medium as prepared in Example 1 in the same manner as described in Example 2 except that the state wherein the crystal peak of the X-ray diffraction pattern at 2 θ=14° (d=7.73Å) had disappeared was designated as Phase A and was set as a recorded state and that erasing of the recorded information was not conducted. As a result, the difference in reflectance between Phase A and Phase C was increased to about 20% and, therefore, reproducibility was particularly satisfactory.

Thus, the optical recording media in accordance with the present invention can be used not only for reversible optical recording but also for direct reading after writting or reading only memory.

EXAMPLE 4

1) Synthesis of 4,4'-Biphenyldithiol

In a four-necked flask having the atmosphere thereof completely displaced with nitrogen gas were charged 20.3 g of 4,4'-diiosobiphenyl, 16.8 g of sodium ethanethiolate and 200 ml of hexamethylenephosphoric triamide, and the resulting mixture was allowed to react at 100° C. for 1 hour. The reaction mixture was poured into 2 liters of a saturated sodium chloride aqueous solution, and extracted with diethyl ether. The extract was recrystallized from ethanol to obtain 4,4'-bis(ethylthio)biphenyl in a yield of 68.6%. The product was then added to a mixture of liquid ammonia and sodium to effect dealkylation to obtain 4,4'-biphenyldithiol in a yield of 90%.

2) Synthesis of 4,4'-Diethynylbiphenyl

In a flask having its atmosphere completely displaced with nitrogen were charged 19 g of 4,4'-diiodobiphenyl, 1.31 g of bis(triphenylphosphine)palladium dichloride, 0.094 g of cuprous iodide and 500 ml of diethylamine. The temperature was elevated to 30° C. under stirring, and 11.04 g of trimethylsilylacetylene was added to the mixture, followed by allowing the mixture to react for 4.5 hours to obtain 4,4'-di(trimethylsilylethynyl)biphenyl. Hydrolysis of this product yielded 4,4'-diethynylbiphenyl.

An optical recording medium comprising a quartz glass base having deposited thereon an optical recording layer (thickness: 9.7 μm) comprising an aromatic vinylene sulfide polymer was produced in the same manner as described in Example 1 but using an equimolar mixture of powderous crystals of 4,4'-biphenyldithiol and 4,4'-diethynylbiphenyl as prepared in (1) and (2) above. The resulting polymer was identified as an addition polymer having a repeating unit of the formula:

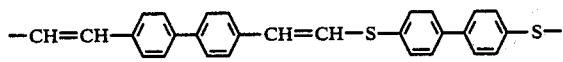

and a number average molecular weight of 1,800 by elementary analysis, infrared absorption analysis and copper acetylide method.

Recording could be carried out on the resulting optical recording medium by induction of phase transition upon application of optical energy, and reading of the recorded information could be effected by making use of a difference in reflectance between different phases.

EXAMPLE 5

2,5-Dimethyl-1,4-benzenedithiol was prepared from 2,5-dimethyl-1,4-dichlorobenzene in the same manner as in Example 1.

An optical recording medium having an optical recording layer (thickness: 10.1 μm) was produced in the same manner as described in Example 1 but using the thus synthesized 2,5-dimethyl-1,4-benzenedithiol in place of p-benzenedithiol.

The polymer formed on the quartz glass base was identified as an addition polymer having a repeating unit of the formula:

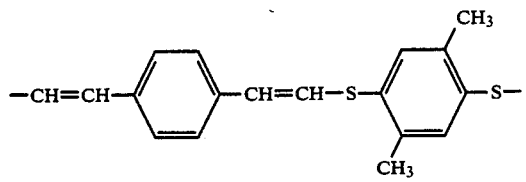

and a number average molecular weight of 2,000 by elementary analysis, infrared absorption analysis and copper acetylide method.

Recording could be carried out on the resulting optical recording medium by induction of phase transition upon application of optical energy, and reproduction of the recorded information could be effected by making use of a difference in reflectance between different phases.

While the invention has been described in detail and with reference to specific embodiments thereof, it will be apparent to one skilled in the art that various changes and modifications can be made therein without departing from the spirit and scope thereof.

What is claimed is:

1. An optically functional element, comprising, as an optically changing element, an aromatic vinylene sulfide polymer having a repeating unit represented by the formula:

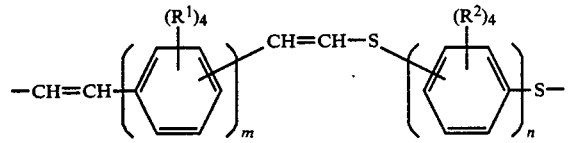

wherein $R^1$ and $R^2$, which are the same or different, each represent a hydrogen atom, an alkyl group having from 1 to 12 carbon atoms, or a halogen atom; m and n each represent an integer of from 1 to 5; and when m and n each is an integer of from 2 to 5 the substituents in the repeating units and the structures of the repeating units are the same or different; and wherein the said aromatic vinylene sulfide polymer has a number average molecular weight of from 800 to 500,000 and is a crystalline polymer having a crystallinity of from 10 to 100% as determined by X-ray analysis, wherein at least one of m and n represents an integer of from 2 to 5.

2. The optically functional element of claim 1, wherein $R^1$ and $R^2$, which are the same or different, each represent a hydrogen atom, and alkyl group having from 1 to 3 carbon atoms, or a halogen atom.

3. The optically functional element of claim 2, wherein $R^1$ and $R^2$, which are the same or different, each represent a hydrogen atom, a methyl group, an ethyl group, or a halogen atom.

4. The optically functional element of claim 1, wherein m and n each represent an integer of from 1 to 3.

5. The optically functional element of claim 1, wherein at least one of $(R^1)_4$ is an electron-attractive group, and at least one of $(R^2)_4$ is an electron-donative group.

6. The optically functional element of claim 1, wherein the said element is an optical recording medium.

7. The optical recording medium of claim 1, wherein the said crystalline polymer has a crystallinity of from 50 to 100%.

8. The optical recording medium of claim 1, wherein the said crystalline polymer has a crystallinity of from 80 to 100%.

9. The optical recording medium of claim 1, wherein the said crystalline polymer is prepared by simultaneously evaporating compounds of the formulae (II) and (III)

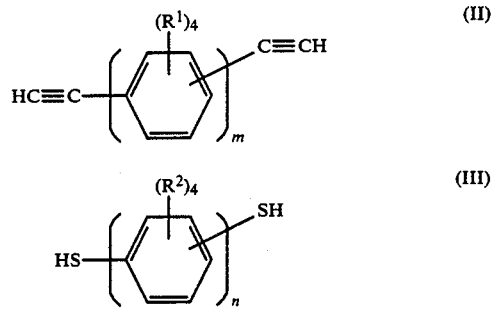

to deposit mixed monomer crystals on a base and polymerizing the deposited mixed monomer crystals.

10. The optical recording medium of claim 9, wherein the temperature of the base at deposition is at least 5° C. lower than the melting point of the deposited mixed monomer crystals.

11. The optical recording medium of claim 9, wherein the temperature of the base at deposition and the polymerization reaction temperature are at least 5° C. lower than the melting point of the deposited mixed monomer crystals.

12. The optical recording medium of claim 1, wherein the crystalline polymer has a number average molecular weight of from 800 to 15,000.

13. The optical recording medium of claim 1, wherein the crystalline polymer has a number average molecular weight of from 950 to 9,500.

14. An optically functional element, comprising, as an optically changing element, an aromatic vinylene sulfide polymer having a repeating unit represented by the formula:

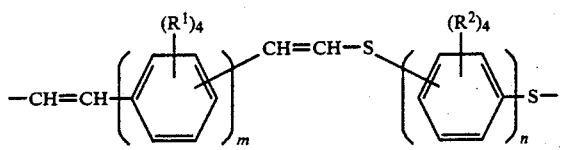

wherein $R^1$ and $R^2$, which are the same or different, each represent a hydrogen atom, an alkyl group having from 1 to 12 carbon atoms, or a halogen atom; m and n each represent an integer of from 1 to 5; and when m and n each is an integer of from 2 to 5 the substituents in the repeating units and the structures of the repeating units are the same or different; and wherein the said aromatic vinylene sulfide polymer has a number average molecular weight of from 800 to 500,000 and is a crystalline polymer having a crystallinity of from 10 to 100% as determined by X-ray analysis, wherein said element is an optical recording medium comprising a base having laminated thereon two or more of said aromatic vinylene sulfide polymers having different substituents or having different molecular weights.

15. An optically functional element system, comprising a source of optical energy and an optically changing element, said source of optical energy comprising a means for applying light energy to said optically changing element, said optically changing element comprising an aromatic vinylene sulfide polymer obtained by depositing a mixed monomer crystal on a base and polymerizing said deposited mixed monomer crystal, said aromatic vinylene sulfide polymer having a repeating unit represented by the formula:

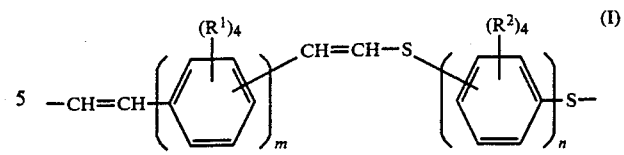

wherein $R^1$ and $R^2$, which are the same or different, each represent a hydrogen atom, an alkyl group having from 1 to 12 carbon atoms, or a halogen atoms; m and n each represent an integer of from 1 to 5; and when m and n each is an integer of from 2 to 5 the substituent in the repeating units and the structures of the repeating units are the same or different, and wherein the said aromatic vinylene sulfide polymer has a number average molecular weight of from 800 to 500,000;
wherein when said system comprises said means for applying light energy to said optically changing element, said optically changing element comprises a base supporting an optical recording layer comprising said polymer and a protective layer supported by said recording layer.

16. An optically changing element, comprising:
(i) a base,
(ii) a layer of an aromatic vinylene sulfide polymer having a repeating unit represented by the formula:

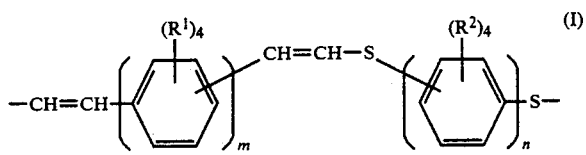

wherein $R^1$ and $R^2$, which are the same or different, each represent a hydrogen atom, an alkyl group having from 1 to 12 carbon atoms, or a halogen atom; m and n each represent an integer of from 1 to 5; and when m and n each is an integer of from 2 to 5 the substituents in the repeating units and the structures of the repeating units are the same or different; and wherein the said aromatic vinylene slufide polymer has a number average molecular weight of from 800 to 500,000, and
(iii) a protective layer;
wherein said layer of said aromatic vinylene sulfide polymer is situated between said base and said protective layer.

17. The optically changing element of claim 16, further comprising a reflective layer situated between said base and said layer of said aromatic vinylene sulfide polymer.

* * * * *